United States Patent [19]

Udall et al.

[11] 4,271,884
[45] Jun. 9, 1981

[54] TIRE FITTING DEVICE

[75] Inventors: William S. Udall; John Martin, both of Sutton Coldfield, England

[73] Assignee: Dunlop Limited, London, England

[21] Appl. No.: 67,107

[22] Filed: Aug. 16, 1979

[30] Foreign Application Priority Data

Aug. 30, 1978 [GB] United Kingdom ............... 34980/78

[51] Int. Cl.³ ............................................. B60C 25/00
[52] U.S. Cl. ........................................................ 157/1
[58] Field of Search ..................................... 157/1, 1.1

[56] References Cited

U.S. PATENT DOCUMENTS

| 2,694,225 | 11/1954 | Rose | 157/1 X |
| 2,926,726 | 3/1960 | Schultz | 157/1 |
| 3,709,278 | 1/1973 | Comer | 157/1 |

FOREIGN PATENT DOCUMENTS

| 305533 | 10/1929 | United Kingdom . |
| 1314962 | 4/1973 | United Kingdom . |
| 1518361 | 8/1976 | United Kingdom . |

Primary Examiner—James G. Smith
Attorney, Agent, or Firm—Stevens, Davis, Miller & Mosher

[57] ABSTRACT

A tire fitting device comprises a strip for location in an annular groove adjacent to a bead seat to prevent a tire bead engaging the groove prior to inflation of the tire and a handle for mounting on the wheel rim to locate the tire in the well and prevent the tire beads slipping around the rim edge during fitting.

The strip comprises a length of flexible material, e.g. spring steel, which extends around at least half the circumference of the groove. Alternatively the strip may comprise a closed loop of resilient material.

The handle has an attachment portion by which the handle is mounted on the rim and an arcuate portion which engages the tire sidewall to urge the sidewall axially inwards into the well during fitting. The handle is attached to the strip by a flange portion welded to one side of the strip. Alternatively the strip and handle may be separate.

11 Claims, 3 Drawing Figures

TIRE FITTING DEVICE

This invention relates to a tire fitting device.

The conventional method of manually fitting a pneumatic tire to a wheel rim having a well involves locating one bead in the well and levering the other bead over the rim flange and into the well. The tire is then rapidly inflated so that the beads are forced out of the well and engage respective annular axially spaced bead seats.

A problem arises in manually fitting a tire in this way to a wheel rim having a respective annular groove adjacent each bead seat in which a respective projection on the tire beads is received so that the beads are retained on the bead seats when the tire is run deflated. With one bead located in the wheel rim well when the other bead is being levered over the flange there is a tendency for the bead to initially move around the flange and then, when about three quarters of the bead has been fitted, the bead projection tends to catch in the groove rather than run down into the well. When the tire is subsequently rapidly inflated the portion of the bead projection which is caught in the groove may be bent back on itself so that it does not seat properly in the groove with the result that the bead may not form an effective seal with the bead seat and the tire will continually lose air.

According to the present invention we provide a tire fitting device comprising an elongate strip and a handle, the strip being constructed and arranged such that in use the strip is inserted in and extends around a portion of an annular groove in a wheel rim to prevent a tire bead engaging the groove prior to inflation of the tire.

Preferably the strip has a portion complementary to the groove in the wheel rim so that the strip is an interference fit in the groove. The strip is preferably made of spring steel and has an arcuate configuration similar to the groove in the wheel rim.

The strip may be open ended and extend around at least half the circumference of the groove in the wheel rim and more preferably at least three quarters of the circumference. Alternatively the strip may comprise a closed loop of resiliently deformable material which can be stretched to allow fitting of the strip in the groove.

Preferably the handle has an attachment portion which in use engages the wheel rim to mount the handle on the rim so that undesirable slipping of the tire beads around the rim edge during fitting is avoided. Preferably the attachment portion comprises a recess, generally U-shaped, in which the rim is received.

Preferably the handle has a tire engaging portion, for example a rolled over radius, which in use engages the sidewall of the tire to locate the tire in the wheel rim well.

Preferably the tire engaging portion and attachment portion are interconnected by an intermediate grip portion.

The handle is conveniently fixed to the strip, for example by welding an extension of the handle attachment portion to the strip. Alternatively the handle and strip may be separate.

The present invention therefore provides a device which can be inserted into the groove in a wheel rim prior to fitting of the tire to fill the groove so that when the second tire bead is levered over the wheel rim flange the bead cannot engage the groove and therefore runs down into the well. With both beads in the well the device can be removed and the tire inflated in the normal manner so that the beads are correctly seated on the bead seats with respective annular bead portions in engagement with the grooves and an effective seal is obtained between the beads and the associated bead seats.

According to a further aspect of the present invention we provide a method of fitting a tire having a pair of annular axially spaced beads to a wheel rim having a pair of annular axially spaced bead seats, each bead having a projection engageable with an annular groove adjacent to the associated bead seat comprising the steps of inserting a filler strip in a portion of one groove, locating the tire over a handle mounted on the wheel rim, passing one bead over the adjacent edge of the wheel rim and then passing the other bead over the adjacent edge of the wheel rim and removing the filler strip and handle prior to inflation of the tire.

The invention will now be described in more detail, by way of example only, with reference to the accompanying drawings in which.

Figure 1:
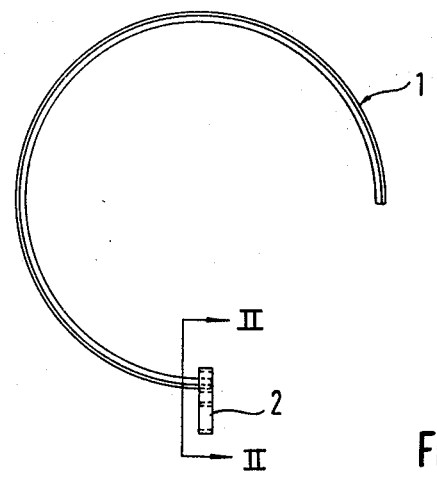
FIG. 1 is a plan view of one embodiment of the device according to the present invention.
Figure 2:
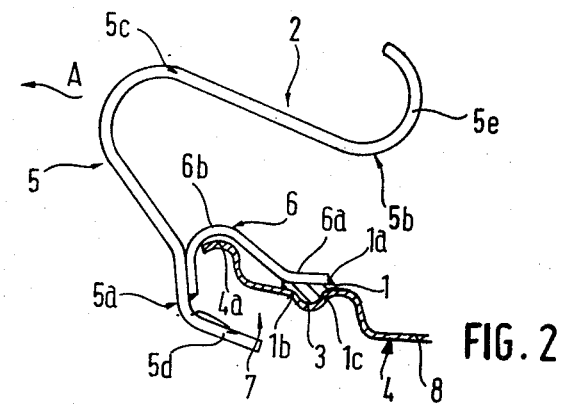
FIG. 2 is a section on the line II—II of FIG. 1, and showing the device engaging a groove on a wheel rim.

The tire fitting device shown in FIGS. 1 and 2 of the accompanying drawings comprises an elongate strip 1 and a handle 2.

The strip 1 is made of spring steel and has an arcuate shape similar to an annular groove 3 in a wheel rim 4. The length of the strip 1 is approximately three quarters the circumference of the groove 3. As shown one side 1a of the strip, which in use is the upper or outer side, is flat and the other side 1b has a centre portion 1c complementary to the groove 3. The centre portion 1c is an interference fit in the groove 3 as shown in FIG. 2.

The handle 2 comprises two members 5 and 6 formed from flat strips of metal, for example steel, aluminium or aluminium alloy, bent to the shapes shown and welded together.

The member 5 comprises end portions 5a, 5b and an intermediate portion 5c. The end portion 5a terminates in a flange 5d which in use extends in a generally axial direction and engages an outer surface of the wheel rim 4. The end portion 5b terminates in a rolled over radius 5e which in use engages the outer surface of the sidewall of a tire to be fitted (not shown).

The handle 2 is secured to one end of the strip 1 by welding a flange portion 6a of the member 6 to the side 1a of the strip. The flange portion 6a leads to a web portion 6b which in use extends over the outer edge 4a of the wheel rim and is secured to the end portion 5a of the member 5 by welding. The web portion 6b and flange 5d define a generally U-shaped recess 7 in which the rim is received in use to attach the handle to the rim.

In use the strip 1 is located in the groove 3 in the wheel rim 4 as shown in FIG. 2 and the handle is attached to the wheel rim 4 so that the radius 5e of the member 5 projects axially inwards to a position in which it overlies the well 8 of the wheel rim. The tire to be fitted (not shown) is then passed over the handle 2 and located so that the tire beads (not shown) lie adjacent to the outer edge 4a of the wheel rim and the radius 5e engages the outer sidewall of the tire. The handle 2 is urged axially outwards in the direction of the arrow A in FIG. 2 by the engagement of the radius 5e with the tire sidewalls so that the handle is positively located on the rim and does not move around the rim during fitting of the tire. The first bead is then levered over the edge 4a of the wheel rim and located in the well 8 in the usual manner. The second bead is then levered over the edge 4a of the wheel rim. It will be appreciated that the positive location of the handle on the rim prevents the second bead moving around the edge 4a of the wheel rim during fitting and when the bead has been passed over the edge, the engagement of the radius 5e with the sidewall ensures that both the sidewall and bead are urged into the well. The location of the strip 1 in the groove 3 ensures that the bead projections run over the groove 3 into the well 8 and cannot engage the groove 3 prior to inflation of the tire. With both beads located in the well 8 the strip 1 can be lifted out of the groove 3 and the handle detached from the rim so that the tire can be inflated in the usual way. It will be understood that the tire cannot be inflated before the device is removed due to the biassing of the adjacent tire sidewall into the well 8 by the handle 2.

Figure 3:
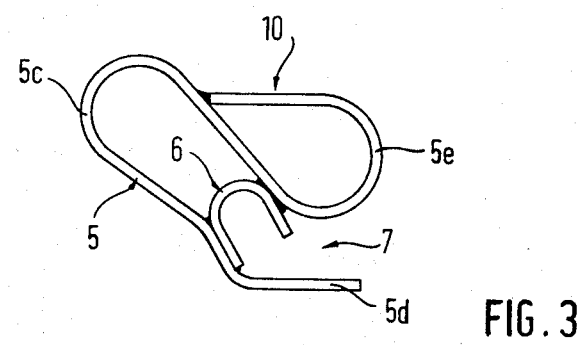
FIG. 3 is a side elevation of an alternative handle construction.

FIG. 3 shows a handle 10 similar to that described above with reference to FIGS. 1 and 2 except that the flange portion 6a of the member 6 by which the above-described handle 2 is connected to the strip 1 is omitted. Like reference numerals are used to indicate corresponding parts.

The handle 10 is not attached to the strip so that in use the handle can be positioned at any point around the circumferential edge of the rim irrespective of the position of the strip. In addition the handle 10 is made more rigid than the handle 2 by welding the rolled over radius 5e to the intermediate grip portion 5c and also welding the end portions 5a, 5b to respective limbs of the U-shaped member 6.

The above-described device can be modified in a number of ways, for example the handle 2 may be secured to the strip 1 at any point along the length of the strip. The strip can be made of any suitable flexible material, for example plastics material so that the strip can be deformed to fit grooves of varying dimensions. The strip may comprise a closable loop or a closed loop made of resilient material so that the loop can be stretched to pass over the rim edge to facilitate location of the strip in a groove. The strip and groove may be of complementary cross-section as described but this is not essential it only being necessary for the strip to fill the groove sufficiently to prevent the tire bead locating in the groove.

The handle may be coated with plastics material to prevent the wheel surface being marked by the handle during fitting.

Having now described our invention what we claim is:

1. A device for fitting a pneumatic tire to a wheel rim having an axial outer flange, an adjacent annular bead seat with an annular groove adjacent said bead seat and a central well of smaller diameter than said bead seat, said device comprising:
   a handle and an elongate strip fixed to said handle;
   said handle having an attachment portion for attaching said handle to one axial outer edge of a wheel rim;
   a tire engaging portion to assist in locating a tire in a wheel rim well, said strip, when in position, being in overlying abutment relationship to an annular groove in said wheel rim to prevent a tire bead from engaging that groove prior to inflation of the tire.

2. A device according to claim 1 in which said strip is open ended and extends around at least half the circumference of said groove.

3. A device according to claim 1 in which said strip is in the form of a closed loop made of resilient material to enable said loop to be stretched so as to pass over the edge of said rim.

4. A device according to claim 1 in which said strip and groove are of complementary cross-section.

5. A device according to claim 1 in which said attachment portion defines a recess in which the rim is received.

6. A device according to claim 1 in which said tire engaging portion is of arcuate profile.

7. A device according to claim 1 in which an extension of said attachment portion is fixed to said strip.

8. A device according to claim 1 in which said handle comprises two strips of metal welded together.

9. A device according to claim 8 in which said handle is coated with a plastic material.

10. A method of fitting a tire having a pair of annular axially spaced beads to a wheel rim having a pair of annular axially spaced bead seats, each bead having a projection engageable with an annular groove adjacent to the associated bead seat comprising the steps of inserting a filler strip in a portion of one groove, locating said tire over a handle mounted on said wheel rim, passing one bead over the adjacent edge of said wheel rim and then passing the other bead over said adjacent edge of said wheel rim and removing said filler strip and handle prior to inflation of said tire.

11. The device of claim 1 in which the strip is engageable in an annular groove in a wheel rim.

* * * * *